A. D. Westbrook,
Horse Boots,
Nº 63,821.   Patented Apr. 16, 1867.

Witnesses;
Jno. Brown
Thos. T. Parker

Inventor;
A. D. Westbrook
Per J. Fraser & Co.
Attys

United States Patent Office.

ABRAHAM D. WESTBROOK, OF BUFFALO, NEW YORK, ASSIGNOR TO HIMSELF. R. W. DANIELS, AND JOHN HUMPHREY, OF THE SAME PLACE.

Letters Patent No. 63,821, dated April 16, 1867.

---

IMPROVEMENTS IN PROTECTING PADS FOR INTERFERING HORSES.

---

The Schedule referred to in these Letters Patent and making part of the same.

---

TO ALL WHOM IT MAY CONCERN:

Be it known that I, ABRAHAM D. WESTBROOK, of the city of Buffalo, in the county of Erie, and State of New York, have invented a certain new and improved Protecting Pad for Interfering Horses; and I do hereby declare that the following is a full and exact description thereof, reference being had to the accompanying drawings, making part of this specification, in which—

Figure 2:
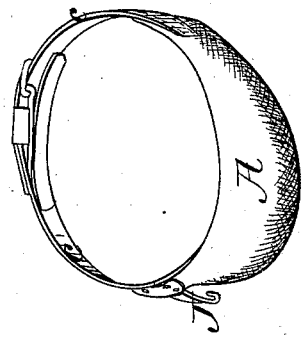
Figure 2 is a perspective view of the pad detached.
Figure 1:
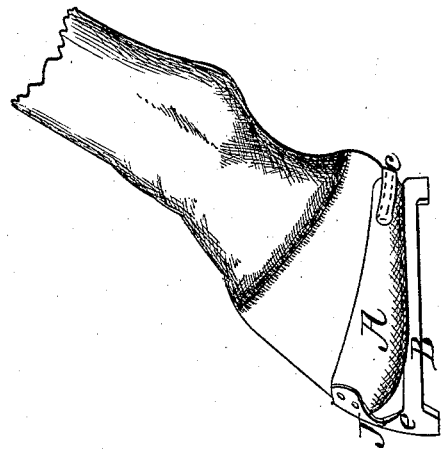
Figure 1 represents a horse's foot provided with one of my protecting pads.

The ordinary devices employed to protect a horse's leg from being cut or bruised by interfering have been applied to that part of the leg most liable to be injured; and, as some horses interfere at several points, which varies in different horses, it has been found necessary to employ two or more shields to the same leg, and a matter of extreme difficulty to properly secure them at the required point, and still leave them sufficiently loose, as to prevent the wearing off of the hair, fretting the skin, or unduly binding the muscles of the limb. My improved pad is designed to be applied to the hoof of that foot which interferes in such a manner as to prevent the possibility of the opposite leg being injured by it at any point, thereby dispensing with the use of but one shield, its construction being such as enables it to be firmly secured to the hoof without the liability of any injury resulting therefrom. The invention consists of a pad of India rubber, or equivalent elastic material, inflated, or otherwise filled, with air, or a liquid, and provided in front with a small hook, which engages with a hole in the clip of the shoe, to prevent it slipping up in front, and with suitable straps, attached to each end of the pad, for buckling around the hoof, the formation of the hoof being such as to prevent it from working up at the heel, while the projection of the shoe prevents it sliding down.

In the drawings, A represents a pad of India rubber, formed in any suitable way, so as to be inflated or filled with air, or a liquid, to give it the required distention and elasticity. It is preferably constructed of the form shown, and of sufficient length to encircle the hoof on the inner side, so that, when applied to the hoof, as represented, and distended, the lower portion will project outward sufficiently, so that, when the animal interferes, the soft pad will prevent the shoe B from coming in contact with the leg, thus effectually protecting it at all points that would otherwise be liable to injury. To each end of the pad is secured, by sewing or otherwise, a strap, c, which encircles the hoof, and buckles on the outside, as represented. The formation of the hoof is such as to give the pad a tendency to work up in front and down at the heel. The angle formed by the hoof at its junction with the shoe at the heel retains the strap against displacement at that point. To secure the pad in front I attach to the latter, by riveting or other suitable way, a small hook, J, which, by hooking in a hole made in the clip e, forms a secure and, at the same time, neat fastening. It is evident that my method of fastening, by means of hook J, is equally adapted to, and may be employed with, pads made of leather or other material stuffed, and operate substantially the same, as its function is to secure pads, in the manner shown, irrespective of the kind of material of which they are formed.

The advantages of my improvement are obvious. Only one pad is required to protect a leg at all the points liable to injury. It presents a neat appearance, and may be firmly secured in place without any inconvenience to the animal from excessive binding of the muscles, or any injury by wearing off the hair or abrading the skin, which frequently ensues with the methods of protection in ordinary use. The construction of a pad of elastic material, inflated or distended with air or a liquid, forms a pad of superior softness, and, being formed by moulding, can be made to present a less objectionable appearance than when composed of other material.

What I claim as my invention, and desire to secure by Letters Patent, is—

Retaining a pad in place on a horse's hoof by means of a hook, J, which engages with the clip e of the shoe, substantially as set forth.

In witness whereof I have hereunto signed my name in the presence of two subscribing witnesses.

A. D. WESTBROOK.

Witnesses:
   JAY HYATT,
   ALBERT HAIGHT.